US009898800B2

(12) United States Patent
Ohta (10) Patent No.: US 9,898,800 B2
(45) Date of Patent: Feb. 20, 2018

(54) IMAGE PROCESSING APPARATUS AND IMAGE PROCESSING METHOD

(71) Applicant: OMRON Corporation, Kyoto-shi, Kyoto (JP)

(72) Inventor: Takashi Ohta, Shiga (JP)

(73) Assignee: OMRON Corporation, Kyoto (JP)

( * ) Notice: Subject to any disclaimer, the term of this patent is extended or adjusted under 35 U.S.C. 154(b) by 135 days.

(21) Appl. No.: 14/587,805

(22) Filed: Dec. 31, 2014

(65) Prior Publication Data

US 2015/0262327 A1   Sep. 17, 2015

(30) Foreign Application Priority Data

Mar. 13, 2014   (JP) .................................. 2014-050718

(51) Int. Cl.
| G09G 5/00 | (2006.01) |
| G06T 3/00 | (2006.01) |
| G06T 11/60 | (2006.01) |

(52) U.S. Cl.
CPC ............ *G06T 3/0093* (2013.01); *G06T 11/60* (2013.01); *G06T 2210/44* (2013.01)

(58) Field of Classification Search
CPC .......................... G06T 2210/44; G06T 3/0093
USPC ....................................................... 345/646
See application file for complete search history.

(56) References Cited

U.S. PATENT DOCUMENTS

| 6,035,075 A | 3/2000 | Inoue et al. |
| 6,081,611 A | 6/2000 | Linford et al. |
| 8,207,971 B1 * | 6/2012 | Koperwas ............... G06T 13/40 345/473 |
| 2001/0036860 A1 * | 11/2001 | Yonezawa ............... G06T 13/40 463/30 |
| 2004/0250210 A1 * | 12/2004 | Huang ................. G06Q 50/265 715/706 |
| 2008/0174795 A1 * | 7/2008 | Andres Del Valle ... G06T 11/60 358/1.9 |
| 2010/0135532 A1 | 6/2010 | Nakagomi |

(Continued)

FOREIGN PATENT DOCUMENTS

| JP | 2009-009296 A | 1/2009 |
| JP | 2010-152871 A | 7/2010 |
| JP | 2011-233073 A | 11/2011 |
| JP | 5240795 B2 | 7/2013 |

OTHER PUBLICATIONS

Extended European Search Report issued in corresponding European Application No. 14200546.1 dated Dec. 11, 2015 (7 pages).

(Continued)

*Primary Examiner* — Jin Ge
(74) *Attorney, Agent, or Firm* — Osha Liang LLP (57) ABSTRACT

An image processing apparatus that morphs at least part of an input image has an image acquiring unit that acquires an input image, an object specifying unit that specifies an object that is included in the input image and is to be morphed, a map storage unit in which a shift amount map, which is a map in which shift amounts of pixels in a two-dimensional plane are defined, is stored, a map morphing unit that morphs the shift amount map according to a shape of the object to be morphed, and an image morphing unit that morphs the image by determining a shift amount of a pixel that corresponds to the object based on the morphed shift amount map and shifting the pixel.

9 Claims, 6 Drawing Sheets

(56) References Cited

U.S. PATENT DOCUMENTS

| | | | |
|---|---|---|---|
| 2010/0183228 A1* | 7/2010 | Matsuzaka | G06K 9/621 |
| | | | 382/195 |
| 2013/0039599 A1 | 2/2013 | Aoki et al. | |
| 2014/0085514 A1* | 3/2014 | Lin | H04N 5/217 |
| | | | 348/241 |
| 2014/0185939 A1* | 7/2014 | Kim | G06T 3/0006 |
| | | | 382/201 |

OTHER PUBLICATIONS

Wolberg G Ed-Wolberg G: "Digital Image Warping", Jan. 1, 1992 (Jan. 1, 1992), Digital Image Warping, Los Alamitos, IEEE Comp. Soc. Press, US, pp. 222-230, XP002200172, *Section 7.5.2 on pp. 224 and 225; figures 7.16* (9 pages).

Wolberg G: "Recent Advances in Image Morphing", Proceedings. Computer Graphics International, XX, XX, Jan. 1, 1996 (Jan. 1, 1996), pp. 64-71, XP001023723, *p. 65-66, sections 2.1 and2.2* (8 pages).

Office Action issued in corresponding Japanese Application No. 2014-050718, dated Nov. 14, 2017 (6 pages).

Sogawa et al., "Facial Expression Synthesis on Any User Defined Face Model Using an Geometry Movement Map," IEICE Technical Report, vol. 102, No. 598, pp. 19-24; The Institute of Electronics, Information and Communication Engineers; Jan. 17, 2003 (8 pages).

Omura et al., "Fast B-spline transformation for automatic small face generation using Adaptive Table," Image Laboratory, vol. 22, No. 2, pp. 16-22, Japan Industrial Publishing Co., Ltd., Feb. 10, 2011 (9 pages).

* cited by examiner

IMAGE PROCESSING APPARATUS AND IMAGE PROCESSING METHOD

CROSS-REFERENCE TO RELATED APPLICATIONS

This application claims priority to Japanese Patent Application No. 2014-050718, filed on Mar. 13, 2014, which is hereby incorporated by reference herein in its entirety.

BACKGROUND

Field of the Invention

The present invention relates to an image processing apparatus that morphs part of an image.

Related Art

In recent years, digital cameras that have a function of capturing a subject more beautifully, and software that has a function of processing a captured image so that it looks more beautiful have become widely used. A function of morphing part of an image is an example of one of such functions. When this function is used, it is possible to perform correction such that the face or mouth of a person in a picture looks smaller, or the eyes of the person larger, for example.

Various methods have been developed for morphing part of an image without bringing a feeling of strangeness to viewers of the image. For example, in an image morphing apparatus disclosed in JP 5240795B, morphing of an image is performed by dividing a region (such as a person's face) of an image that is to be corrected into a grid, and calculating shift amounts and directions of pixels for the respective squares of the grid.

JP 5240795B is an example of background art.

In the apparatus disclosed in JP 5240795B, image morphing processing is performed by temporarily expanding image data in a memory space, and calculating the degree of correction for each square of the grid using three-dimensional spline interpolation. On the other hand, when a portable device such as a mobile phone has the image morphing function, there is often the case where, due to restrictions of memory capacity and processing speed, it is difficult to expand a large amount of data and to perform a complicated arithmetic operation.

One or more embodiments of the present invention provides an image processing apparatus that can morph an image with a small amount of processing and a small amount of memory consumption.

SUMMARY

An image processing apparatus according to one or more embodiments of the present invention is an apparatus that morphs an object to be processed (hereinafter, referred to as an object) that is included in an image into a desired shape by morphing at least part of the image.

Specifically, an image processing apparatus according to one or more embodiments of the present invention morphs at least part of an input image, and includes an image acquiring unit configured to acquire an input image; an object specifying unit configured to specify an object that is included in the input image and is to be morphed; a map storage unit in which a shift amount map, which is a map in which shift amounts of pixels in a two-dimensional plane are defined, is stored; a map morphing unit configured to morph the shift amount map according to the shape of the object to be morphed; and an image morphing unit configured to morph the image by determining a shift amount of a pixel that corresponds to the object based on the morphed shift amount map, and shifting the pixel.

The object specifying unit is a unit configured to specify an object that is to be morphed and included in an image. "Object that is to be morphed" may refer to, for example, the entire face, the eyes, the mouth, or the like in a case where the subject is a person's face. Alternatively, "object that is to be morphed" may be an object other than a person's face. Furthermore, the object to be morphed may be detected automatically, or may be designated by a user.

The shift amount map is a two-dimensional map in which shift amounts of pixels are defined. In an image processing apparatus according to one or more embodiments of the present invention, the map morphing unit morphs a shift amount map according to the shape of the object, and shift amounts of pixels are determined based on the morphed shift amount map. According to this configuration, it is possible to obtain shift amounts of pixels that are needed for morphing the object only by determining the correspondence relationship between the map and the pixels, without a complicated arithmetic operation. In other words, it is possible to reduce the cost of image morphing processing.

Furthermore, the image processing apparatus according to one or more embodiments of the present invention may further include a shift direction setting unit configured to set a direction in which the pixel of the object to be morphed is to be shifted, wherein the image morphing unit shifts the pixel in the set direction.

By the shift direction setting unit setting a direction in which the pixel is to be shifted, it is possible to designate an object morphing method. For example, when morphing is performed such that "pixels that corresponds to a person's face are shifted toward the center of the face", the face of a person who is a subject can be corrected so as to be smaller. The direction in which the pixel is to be shifted may also be obtained from a user, or may be determined automatically. For example, a configuration is also possible in which the central point of the object is estimated, and pixels are shifted to the central point.

Furthermore, the object specifying unit extracts control points that correspond to the object to be morphed, and the map morphing unit morphs the shift amount map based on the positions of the control points.

"Control point" refers to a point that characterizes the shape of an object to be morphed, and is typically a point that indicates an edge or corner of the object, but the present invention is not limited to this. By using the control point, it is possible to morph the shift amount map into the shape that is better suited to the shape of the object to be morphed.

Furthermore, the image morphing unit may align the morphed shift amount map with the object to be morphed, and determine a shift amount that corresponds to the pixel.

By aligning the morphed shift amount map and the object to be morphed, it is possible to associate a pixel that is to be shifted with the shift amount thereof. Note that when the pitch of the pixels of the image does not match the pitch of the map, either one of the pitches can be increased or reduced so that they match each other.

Furthermore, the shift direction setting unit sets a direction in which the pixel is to be shifted by setting a target point in the image, the shift amount map includes coordinates of a point that corresponds to the target point, and the image morphing unit uses the target point to align the morphed shift amount map and the object to be morphed.

The shape of the shift amount map and the shape of the object to be morphed do not necessarily match each other.

Therefore, a target point may be used as common coordinates at which the shift amount map and the object are aligned.

Furthermore, the map storage unit may have stored therein a plurality of shift amount maps corresponding to a plurality of types of objects and/or a plurality of morphing methods, and the map morphing unit and the image morphing unit may select, from among the plurality of shift amount maps, a shift amount map that corresponds to type of the object to be morphed and/or morphing method, and perform processing.

As described above, the map storage unit may have stored therein a plurality of shift amount maps that respectively correspond to types or shapes of objects, and morphing methods, and processing may be performed using an appropriate shift amount map. With this, it is possible to obtain a more natural morphing result.

One or more embodiments of the present invention may be an image processing apparatus that includes at least some of the above-described units. Furthermore, one or more embodiments of the present invention may be an image processing method. Furthermore, one or more embodiments of the present invention may be a program for causing a computer to execute the image processing method. The above-described processing and units may be implemented in any combination as long as no technical conflict occurs.

According to one or more embodiments of the present invention, it is possible to provide an image processing apparatus that can morph an image with a small amount of processing and a small amount of memory consumption.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
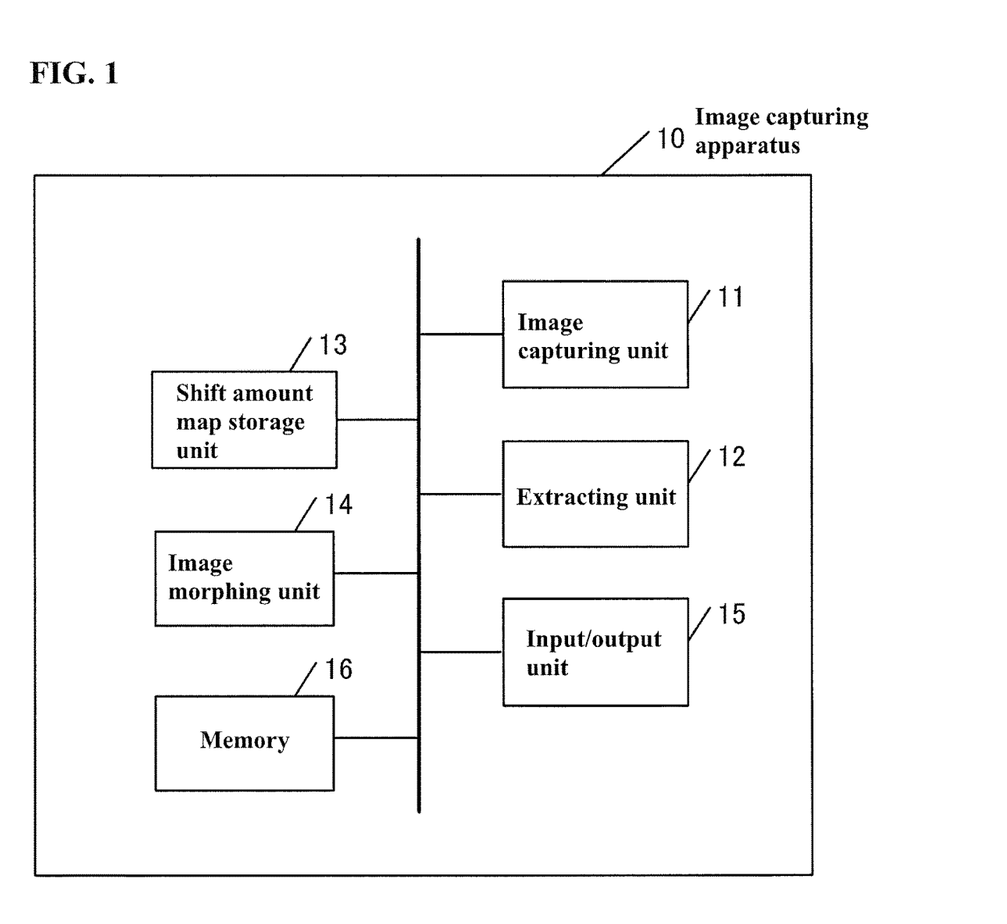
FIG. 1 is a diagram showing a system configuration of an image capturing apparatus according to one or more embodiments of the present invention.

An image capturing apparatus according to a first embodiment is an image capturing apparatus that has a function of detecting a person's face in a captured image and correcting the size of the face or an organ included in the face. For example, the size of the face or mouth of a person who is a subject can be corrected so as to be smaller. FIG. 1 is a diagram showing a system configuration of an image capturing apparatus 10 according to the first embodiment.

The image capturing apparatus 10 includes an image capturing unit 11, an extracting unit 12, a shift amount map storage unit 13, an image morphing unit 14, an input/output unit 15, and a memory 16.

The image capturing unit 11 is a unit that captures an image, and typically includes an optical system, an image sensor, and an interface therebetween. The image capturing unit 11 may include any device as long as it can capture an image.

The extracting unit 12 is a unit that extracts an object that is to be morphed (hereinafter, referred to as an object) from the image captured by the image capturing unit 11. Specifically, the extracting unit 12 specifies a region of the image that includes a person's face, and then extracts feature points included in the region, the feature points corresponding to an organ such as the eyes or mouth. The extracted feature points are stored in association with the organ.

The shift amount map storage unit 13 is a unit in which a two-dimensional map (shift amount map) in which shift amounts of pixels are defined is stored.

Figure 2:
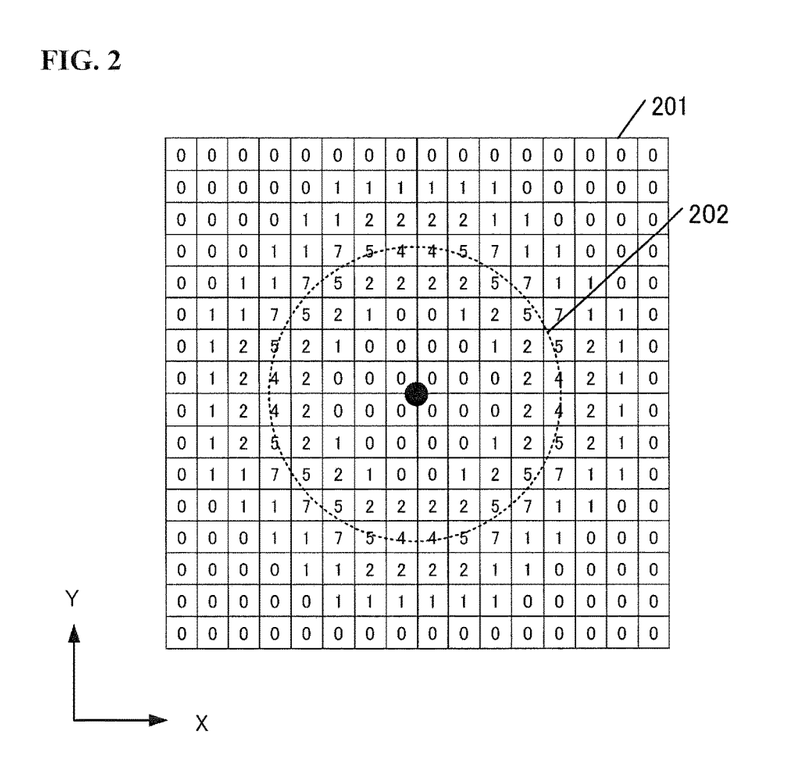
FIG. 2 is a diagram showing an example of a shift amount map for use in a first embodiment.

FIG. 2 shows an example of a shift amount map that is stored in the shift amount map storage unit 13. A numerical value in each square of the grid of the map 201 is a value representing a pixel shift amount. In the first embodiment, a pixel value is used as a value that represents a pixel shift amount, but the pixel shift amount is not limited to a value in any specific unit. For example, a value that is proportional to a shift amount may also be used.

The black circle located at the center of the map 201 is a point serving as a target (hereinafter, referred to as a target point) to which a pixel is shifted. The target point is used for determining direction of morphing of each pixel. Specifically, direction of each pixel is determined as the direction from the position of the pixel to the target point. Furthermore, a dotted line 202 in the map 201 indicates peak shift amounts (hereinafter, referred to as shift amount peaks) as a graphic. That is, the map 201 is a map that corresponds morphing such that "pixels located near the perimeter of a circle are shifted toward the center of the circle". The map 201 is constituted by shift amounts indicated in a two-dimensional array and the coordinates of a target point.

Note that shift amount peaks are used when a shift amount map is morphed. Information on shift amount peaks may be included in the shift amount map itself, or may also be obtained based on an array of shift amounts each time the map is morphed.

The image morphing unit 14 is a unit that morphs the image by determining shift amounts and directions of pixels constituting the image based on the feature points extracted by the extracting unit 12 and the shift amount map stored in the shift amount map storage unit 13. A specific method will be described later.

Furthermore, the input/output unit 15 is a unit that receives an input operation by a user and presents information to the user. Specifically, the input/output unit 15 includes a touch panel and a controller thereof, and a liquid crystal display and a controller thereof. In the first embodiment, one touch panel display serves as the touch panel and the liquid crystal display. The memory 16 is a unit that stores a morphed image. The memory 16 may also be a non-volatile memory such as a flash memory, a fixed disk drive, or the like.

Control of the above-described units is realized by a processing device such as a CPU executing control programs. Furthermore, the control function may also be realized by a field programmable gate array (FPGA), an application specific integrated circuit (ASIC), or the like, or a combination thereof.

Figure 3:
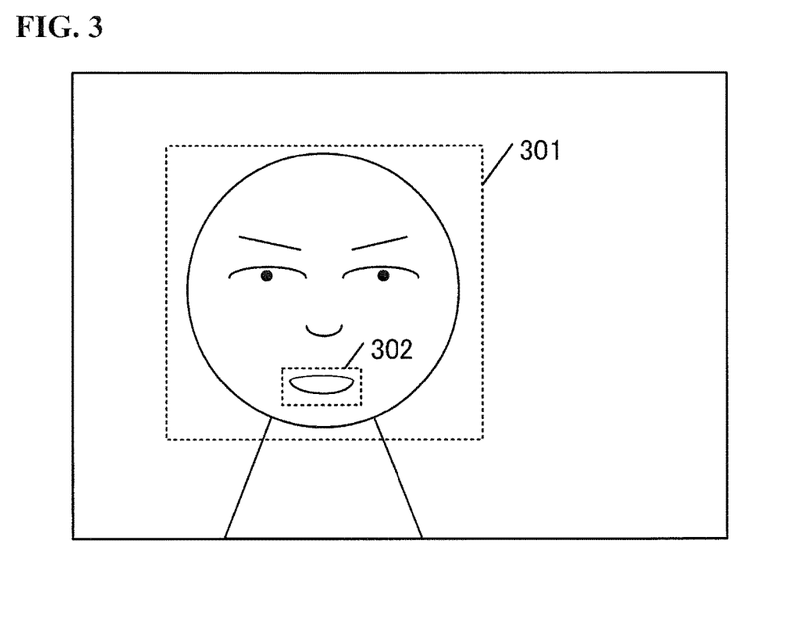
FIG. 3 is a diagram showing an example of an image that is to be morphed.

Hereinafter, method for morphing a captured image will be described. FIG. 3 shows an example of an image that was captured by the image capturing unit 11. The image capturing apparatus 10 according to the first embodiment is an image capturing apparatus that has a function of detecting the mouth of a person in a captured image and correcting the size of the mouth so that the mouth is smaller. Referring to FIG. 3, a method for morphing a captured image will be described below.

(1) Processing for Specifying an Object that is to be Morphed

First, processing performed by the extracting unit 12 will be described. The extracting unit 12 performs processing for detecting a face in an image that was captured by the image capturing unit 11 and specifying an object that is to be morphed. Specifically, the following four steps are executed. Note that image acquisition is assumed to have been completed.

(1-1) Detection of a Face Region

As the first step, a region (face region 301) in which a face is present is detected from an acquired image. A method for detecting a face included in an image is well known, and thus a detailed description thereof is omitted.

(1-2) Detection of an Organ Included in the Face

Then, an organ such as the eyes, nose, or mouth is detected from the inside of the detected face region 301. Any type of organ may be detected as long as it is included in the face. For example, the outer corner of an eye, the inner corner of an eye, an end of the mouth, the chin, a temple, or the like may also be detected. Furthermore, the face itself or a plurality of organs may also be detected. In the present example, since morphing processing is performed on a mouth, a region (mouth region 302) in which the mouth is present is detected. Note that a well-known method may be used for detecting an organ. For example, pattern matching with a template image may be used, or pattern matching using a difference in contrast may be used. Furthermore, it is also possible to extract feature points and specify an organ based on the positional relationship of the feature points.

(1-3) Arrangement of Control Points

Then, the extracting unit 12 arranges control points in the extracted mouth region 302. "Control point" refers to a point that serves as a reference when morphing is performed and, according to one or more embodiments of the present invention, is a point that characterizes the shape of an organ to be morphed. For example, when the eyes or mouth is an organ to be morphed, according to one or more embodiments of the present invention, the outline thereof is detected, and then control points are arranged on the outline. Furthermore, it is also possible to detect corners of an organ (such as the outer and inner corners of an eye or both ends of a lip), and then arrange control points.

Figure 4:
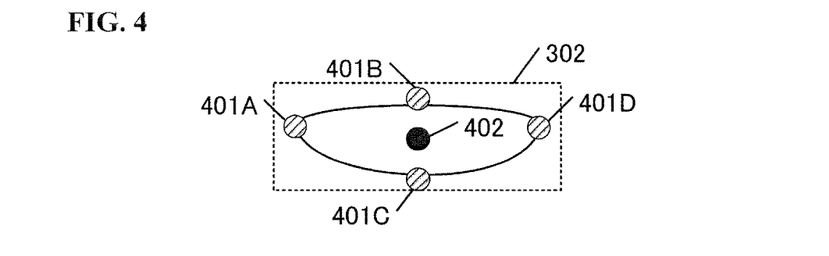
FIG. 4 is a diagram showing the positions at which control points and a target point are arranged.

FIG. 4 is an enlarged view of the mouth region 302. Here, it is assumed that control points 401A to 401D shown in FIG. 4 are arranged. Note that if feature points were extracted at the time of the detection of an organ, the control points may be located at the positions of the feature points.

(1-4) Arrangement of a Target Point

Then, the extracting unit 12 arranges a target point on the image. "Target point" refers to a point that represents shift directions of pixels when the image is morphed. According to the first embodiment, a target point is arranged at the center of the mouth as indicated by the reference numeral 402 in order to correct the mouth of a person included in the image so that it is smaller. With this, it is possible to shift pixels that correspond to the mouth in the directions toward the center of the mouth, and, as a result, it is possible to correct the size of the mouth so that the mouth is smaller.

Note that the position of the target point may also be obtained based on the positional relationship of the control points. For example, the centroid of an ellipse whose perimeter overlaps the control points 401A to 401D may be defined as the target point. Furthermore, if feature points were extracted at the time of the determination of an organ, the position of the target point may also be determined based on the position of the feature points. For example, when an eye is an organ to be detected, the target point may be set at the center of the pupil.

Note that in the above-described example, the extracting unit 12 automatically extracts a region in which the mouth of a person is included, and arranges control points and a target point, but the arrangement of control points and a target point may also be performed manually by a user. Furthermore, either or both of control points and a target point may be arranged manually. When control points and a target point are manually arranged, it is also possible to display an image on a touch panel display, and a user can designate desired positions. Alternatively, a user can designate only a desired organ, and control points and a target point are arranged only with respect to the designated organ.

(2) Image Morphing Processing

Hereinafter, processing performed by the image morphing unit 14 will be described. The image morphing unit 14 performs processing for morphing a captured image based on a shift amount map. Specifically, the following four steps are executed.

(2-1) Morphing of a Shift Amount Map Based on Control Points and a Target Point

First, a shift amount map stored in the shift amount map storage unit 13 is acquired, and the shift amount map is morphed into the shape that is appropriate for an organ that is to be morphed. The map 201 shown in FIG. 2 is a map by which an object that corresponds to an exact circle is morphed, but a mouth that is an object to be morphed is not exactly circular. Therefore, processing in which the shape of the map 201 is morphed so as to match the shape of the mouth is performed in the following procedure.

Figure 5:
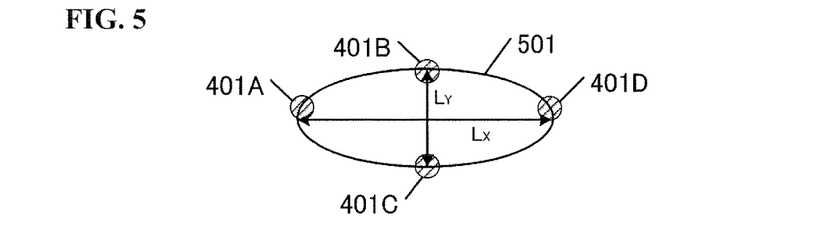
FIG. 5 is a first diagram illustrating a method for morphing a shift amount map.

First, an ellipse whose perimeter overlaps all of the arranged control points is generated. In the case of the example of FIG. 4, an ellipse 501 whose perimeter overlaps the control points 401A to 401D is generated as shown in FIG. 5. Then, a long diameter $L_X$ and a short diameter $L_Y$ of the generated ellipse are obtained, and the respective ratios of the acquired long diameter $L_X$ and the short diameter $L_Y$ to the diameter (defined as $D_p$) of the shift amount peaks 202 of the map 201 are obtained.

Figure 6:
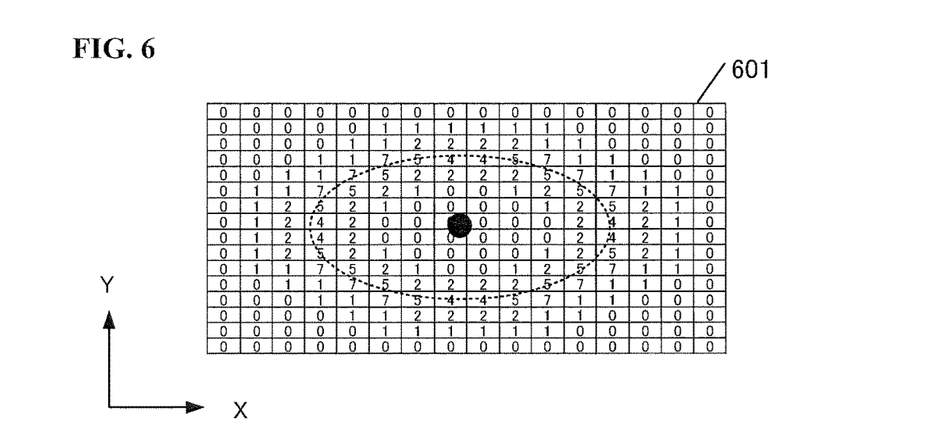
FIG. 6 is a second diagram illustrating a method for morphing the shift amount map.

Then, the size of the map 201 is reduced in the X and Y directions based on the obtained ratios. For example, when $L_X/D_p$ is 0.9 and $L_Y/D_p$ is 0.6, the size of the map 201 is reduced to 90% in the X direction and to 60% in the Y direction. With this processing, the map 201 has a shape such as that of a map 601 shown in FIG. 6.

Note that in the present example, an ellipse whose perimeter overlaps control points is generated, but the present invention is not limited to generating an ellipse, and any curve or straight line that connects all or some of the control points may also be generated. Furthermore, a method different from the exemplified one may be used to perform morphing as long as it is possible to match a shift amount map with the shape of an organ to be morphed.

(2-2) Alignment of the Shift Amount Map

Figure 7:
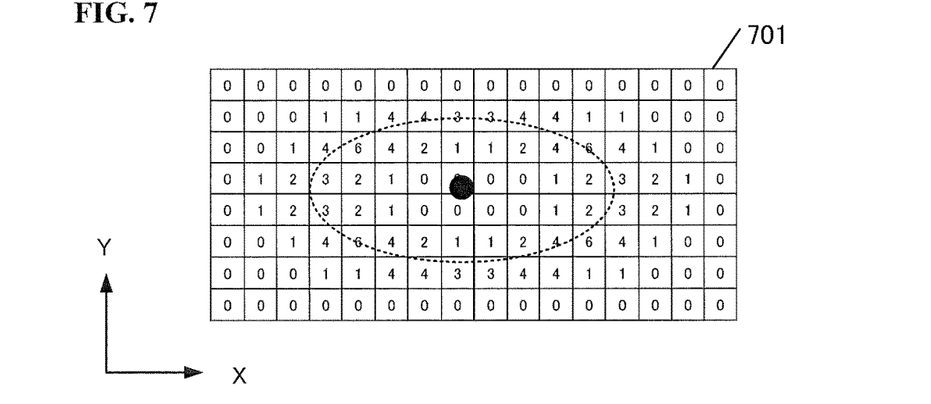
FIG. 7 is a third diagram illustrating a method for morphing the shift amount map.

Then, the morphed shift amount map and the image to be morphed are aligned. Specifically, the coordinates of a target point of the map 601 are matched with the coordinates of the target point set on the image, and the resolution of the map 601 is matched with the resolution of the image. The resolution may be changed using a well-known method, such as bilinear sampling, nearest neighbour sampling, or liner interpolation, for example. FIG. 7 shows an example of a map that is obtained after the resolution of the map 601 is matched with the resolution of the image.

Note that when a shift amount is defined using a pixel as a unit as in the first embodiment, it is also possible to correct shift amount values according to morphing of the map or a change in resolution.

Performing such processing results in a state in which the image to be morphed and the shift amounts defined in the shift amount map are associated with each other in units of pixels. In other words, it is possible to obtain information representing how much the pixels of the image to be morphed are to be shifted.

(2-3) Shifting of Pixels of the Image to be Morphed Using the Shift Amount Map.

Then, processing for shifting the pixels of the image to be morphed is performed using the shift amount map. Specifically, it is determined whether or not shift amounts have been assigned in the shift amount map for the respective pixels of the image to be morphed, and the pixel shifting is performed based on the shift amounts.

Figure 8:
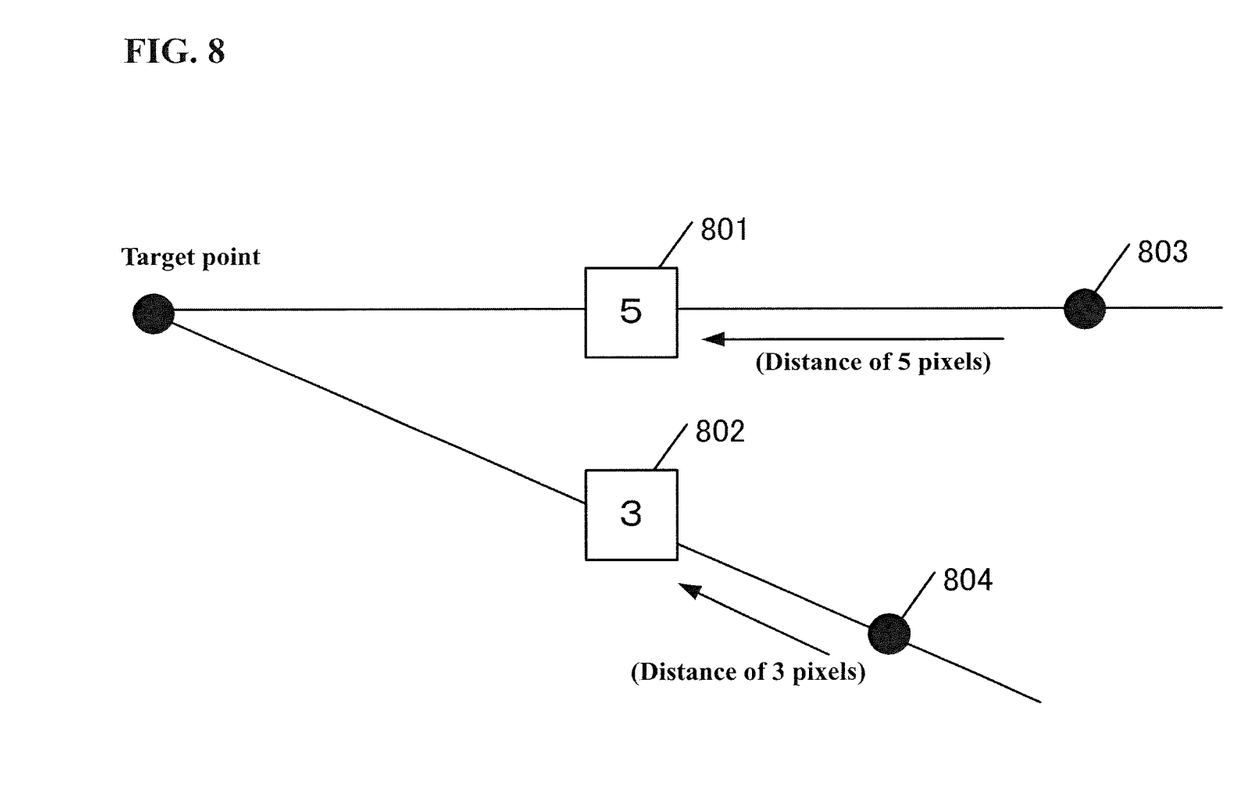
FIG. 8 is a diagram illustrating a pixel shift method.

FIG. 8 is a diagram illustrating a pixel shift method. It is assumed here that a shift amount "5" is assigned to a pixel 801, and a shift amount "3" is assigned to a pixel 802. First, the pixel 801 will be described. The image morphing unit 14 connects the pixel 801, which is a pixel to be processed, and the target point with a straight line, and acquires the pixel value of a pixel that is located further outward than the pixel to be processed, the pixel being located at the position extending from the straight line. In the present example, the pixel value that corresponds to a point 803, which is located five pixels outward from the pixel 801, is acquired and used as the pixel value of the changed pixel 801. Furthermore, when processing is performed on the pixel 802, the pixel value that corresponds to a point 804, which is located three pixels outward from the pixel 802, is acquired and used as the pixel value of the changed pixel 802.

Note that when a shift amount is 0, the original pixel value is used.

By performing such processing on all the pixels, it is possible to generate a morphed image.

Note that a morphed image may also be generated after a memory region is newly secured, or may also be generated by overwriting a pixel value on an existing image. In the latter case, it is only necessary to determine the processing order of pixels, taking into consideration whether or not the pixel is to be referenced later.

Furthermore, there are cases where the point 803 or 804 at which pixel values are to be acquired does not necessarily correspond to a specific pixel (for example, the case where the point is located between pixels). In such a case, a pixel value may be acquired by interpolation from neighboring pixels. The interpolation processing can be performed using a well-known method such as bilinear interpolation, for example.

Furthermore, shifting of pixels is not limited to the exemplified method, and another well-known morphing method may also be used.

Figure 9:
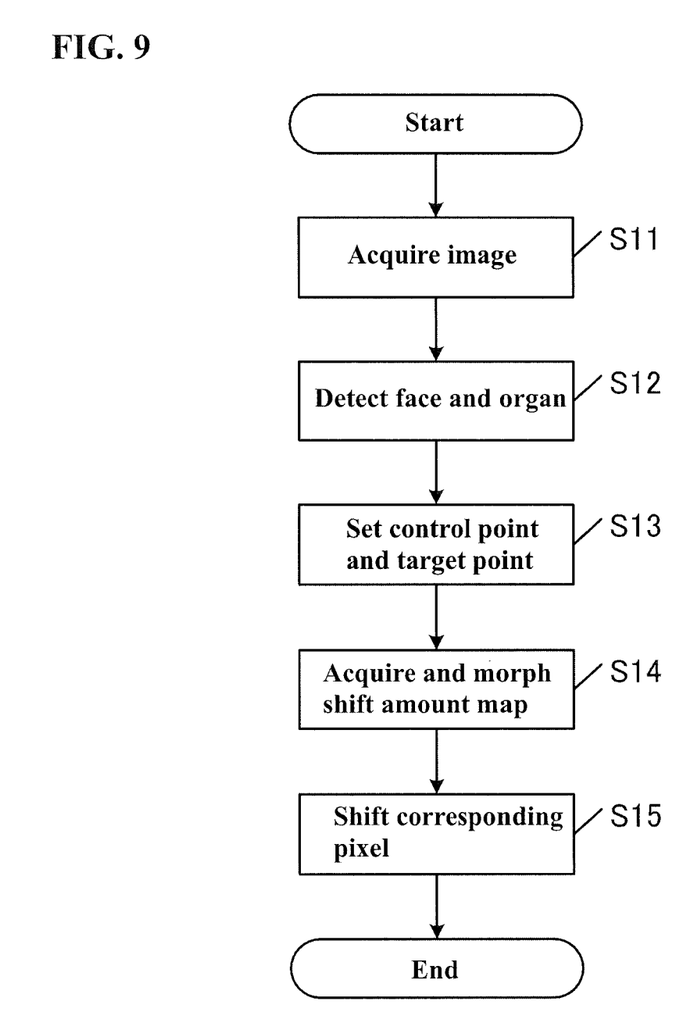
FIG. 9 is a flowchart of processing of an image capturing apparatus according to the first embodiment.

The following will describe a flowchart of processing for realizing the above-described functions. FIG. 9 is a flowchart of processing performed by the image capturing apparatus 10 according to the first embodiment. This processing starts with a user operation (for example, an operation for capturing an image).

First, in step S11, the image capturing unit 11 captures an image.

Then, in step S12, the extracting unit 12 detects a region (face region) that includes a person's face from the captured image, and further detects an organ (in the first embodiment, the mouth) that is included in the face region. In this step, the procedures described in the items (1-1) and (1-2) are performed. Note that determination of a face or another organ may also be performed using pattern matching or the like, or a plurality of feature points are detected and then a face or another organ may be determined using the positional relationship of the feature points.

In step S13, the extracting unit 12 arranges control points and a target point with respect to the organ to be morphed. In this step, the procedures described in the items (1-3) and (1-4) are performed. In the first embodiment, four control points are arranged on the outline of the mouth, and a target point is arranged at the center of the mouth.

Then, in step S14, the image morphing unit 14 acquires a shift amount map from the shift amount map storage unit 13, morphs the acquired shift amount map based on the set control points, and then performs alignment. In this step, the procedures described in the items (2-1) and (2-2) are performed.

Then, in step S15, the image morphing unit 14 shifts pixels that are included in the image to be processed based on the morphed shift amount map, and generates a morphed image. In this step, the procedures described in the item (2-3) are performed. The morphed image is stored in the memory 16, and is provided to a user.

As described above, the image capturing apparatus according to the first embodiment morphs a shift amount map stored in advance, and determines shift amounts and shift directions of pixels, when morphing an image. In the conventional techniques, the degree of correction is calculated for each item to be shifted, such as a pixel or a square of a grid, and thus a complicated calculation is required, but in the image capturing apparatus according to the first embodiment, image morphing can be performed with simple processing, and thus it is possible to realize image morphing with a smaller amount of processing. Furthermore, since the dependence relationship of pixels that is to be referenced is simple, by modifying the order of processing, it is possible to obtain a morphed image without using a memory for buffering.

Second Embodiment

In the first embodiment, a single shift amount map is stored in the shift amount map storage unit 13. In contrast, a second embodiment is an embodiment in which a plurality of shift amount maps are stored in the shift amount map storage unit 13, and image morphing processing is performed by selecting a shift amount map that is appropriate for an object.

An image capturing apparatus according to the second embodiment has the same configuration as that of the first embodiment, and thus a detailed description thereof is omitted, and only a difference from the first embodiment will be described.

Figure 10:
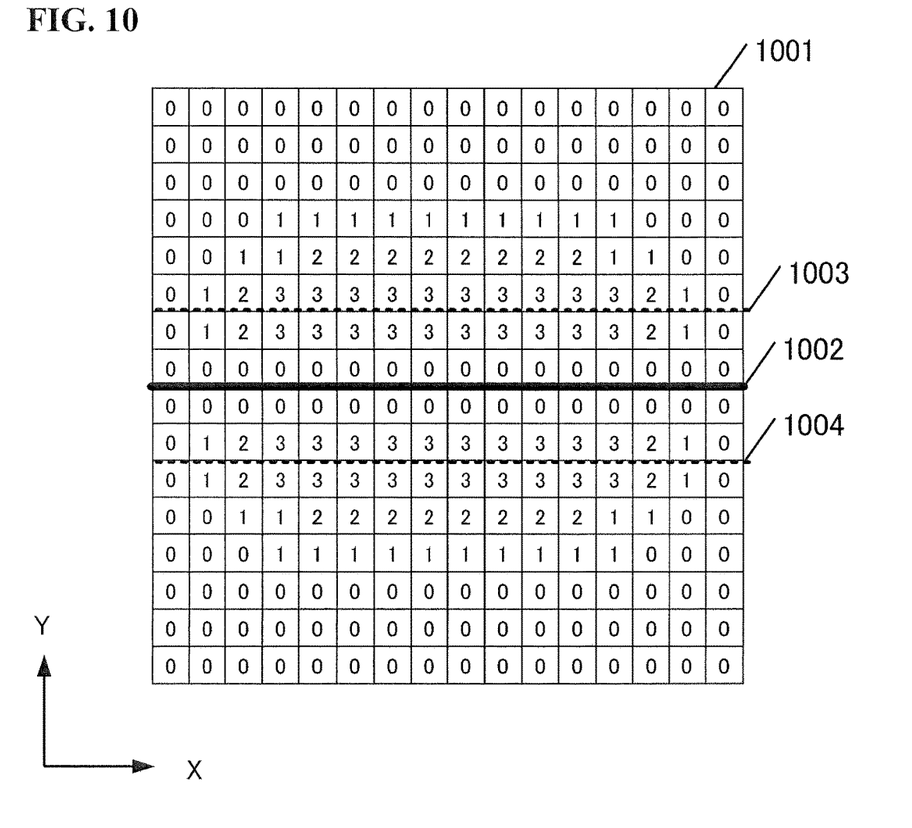
FIG. 10 is a diagram showing an example of a shift amount map for use in a second embodiment.

In the second embodiment, a plurality of shift amount maps that respectively correspond to types of objects to be morphed and morphing methods are stored in the shift amount map storage unit 13. In the second embodiment, description will be given using an example in which, in addition to the map 201 shown in FIG. 2, a map 1001 shown in FIG. 10 is stored in the shift amount map storage unit 13. The map 1001 is a shift amount map that corresponds to morphing such that "pixels that are located in a horizontal direction are shifted in a direction toward a central line 1002". In other words, the numerical value in each square of the grid of the map 1001 is a value representing an amount of shift in which the pixel is morphed toward the central line 1002 along the perpendicular line of the central line 1002. With this, it is possible to achieve an effect, for example, that the lip is thinned while the size of the mouth in the lateral direction remains.

According to the second embodiment, in step S13, instead of the extracting unit 12 arranging a target point, a user designates a pixel shift direction using the input/output unit 15 (touch panel). It is assumed here that a user designates, by drawing, a point or straight line as a pixel shift direction. Here, if a point is inputted the pixel shift direction is a direction toward the point, and if a straight line is inputted the pixel shift direction is a direction approaching perpendicularly to the straight line. Input by user may be considered as designation of morphing method.

In step S14, processing for selecting a map to be used from among the plurality of stored shift amount maps is added to the processing described in the first embodiment. For example, if a user designates a point, the map 201 is selected, and if the user designates a straight line, the map 1001 is selected.

The processing for morphing a shift amount map is the same as that of the first embodiment, but if a straight line (hereinafter, referred to as a target line) is designated as a pixel shift direction, processing for rotating the map 1001 may also be added depending on the direction of the target line. Furthermore, in the case of the example of FIG. 10, the shift amount peaks are indicated by the straight line denoted by the reference numerals 1003 and 1004. Morphing amounts at the time of morphing of the shift amount map may be values representing the state in which the shift amount peaks overlap the control points arranged in the image.

Furthermore, in the first embodiment, alignment of the shift amount map is performed using a target point, but in the second embodiment, alignment is performed using a target line.

Accordingly, in the second embodiment, a shift amount map to be used is selected from among a plurality of shift amount maps, depending on the object morphing method. With this, a user can select a plurality of morphing method.

Note that in the second embodiment, different shift amount maps to be used are selected between a case where a pixel shift direction is designated by a point, and a case where a pixel shift direction is designated by a straight line, but a shift amount map to be used may also selected by another method. For example, a user may also designate a morphing intensity and select one of various shift amount maps depending on the intensity. Furthermore, when an object to be morphed can be selected, it is also possible to select an appropriate shift amount map depending on the type or shape of the selected object.

(Modification)

The above-described embodiments are merely examples, and one or more embodiments of the present invention may suitably be modified and implemented without departing from the spirit of the invention.

For example, in the description of one or more of the above embodiments, the image capturing apparatus including the image capturing unit is taken as an example, but an image is not necessarily acquired via a camera, and may also be acquired from the outside of the apparatus via a wired or wireless network, for example. Furthermore, it is also possible to acquire an image stored in a storage device such as a disk drive or a flash memory. Accordingly, one or more embodiments of the present invention may be implemented as an image processing apparatus for morphing an input image. Alternatively, one or more embodiments of the present invention may also be implemented as image processing software.

Furthermore, in the description of one or more of the above embodiments, an example has been taken in which a person's face is detected, and an organ included in the face is reduced in size, but an object to be morphed is not necessarily a person's face. Furthermore, in the description of one or more of the above embodiments, an example has been given in which an object is reduced in size by arranging a target to which pixels are shifted in the center of a map, but it is also possible that an object is enlarged by arranging a target to which pixels are shifted on the outside of the map. It is furthermore possible that an object is enlarged by arranging a target point in the center of a map and defining a shift amount as a negative value.

Moreover, in the description of one or more of the above embodiments, the maps 201 and 1001 are taken as examples of the shift amount map, but any other type of shift amount map may be used as long as shift amounts and shift directions of pixels can be defined. Furthermore, the direction in which a pixel is to be shifted may also be defined by means other than a point or line.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

LIST OF REFERENCE NUMERALS

10 Image capturing apparatus
11 Image capturing unit
12 Extracting unit
13 Shift amount map storage unit
14 Image morphing unit
15 Input/output unit
16 Memory

What is claimed is:

1. An image processing apparatus that morphs at least part of a face of a subject in an input image, comprising:
    an image acquiring unit that acquires the input image;
    an object specifying unit that specifies an object that is included in the input image and is to be morphed, wherein the object is the at least part of the face of the subject in the input image;
    a map storage unit in which a shift amount map is stored, wherein the shift amount map defines a target point and shift amounts of pixels in a two-dimensional plane along a direction from a position of the pixels to the target point and represents shift amount peaks as a predetermined shape;

a map morphing unit that morphs an entirety of the shift amount map such that the predetermined shape of the shift amount peaks in the map matches a shape of the object to be morphed;

an image morphing unit that morphs the image by: matching the target point in the morphed shift amount map with a target point in the object to be morphed; converting a resolution of the morphed shift amount map so as to match with a resolution of the input image; and determining a pixel value of a target pixel that corresponds to the object as a pixel value of a pixel that is located in a straight line connecting the target point and the target pixel in the input image, the pixel also being located away from the target pixel by a shift amount defined for the target pixel in the morphed shift amount map; and a display that displays the morphed image, wherein the image acquiring unit, the object specifying unit, the map morphing unit, and the image morphing unit are components of an image capturing apparatus, and wherein the predetermined shape is a closed loop.

2. The image processing apparatus according to claim 1, wherein the object specifying unit extracts control points that correspond to the object to be morphed, and wherein the map morphing unit morphs the shift amount map based on the positions of the control points.

3. The image processing apparatus according to claim 1, wherein the map storage unit has stored therein a plurality of shift amount maps corresponding to a plurality of types of objects and/or a plurality of morphing methods, and the map morphing unit and the image morphing unit select, from among the plurality of shift amount maps, a shift amount map that corresponds to a type of object to be morphed and/or morphing method and perform processing.

4. The image processing apparatus according to claim 1, wherein the target point is a single point.

5. The image processing apparatus according to claim 1, wherein the closed loop is a circle.

6. The image processing apparatus according to claim 1, wherein the image morphing unit corrects the shift amount defined in the shift amount map according to morphing of the shift amount map or resolution conversion of the shift amount map.

7. The image processing apparatus according to claim 1, wherein the image morphing unit determines a processing order of the pixels, considers whether a pixel is to be referenced later, and overwrites a pixel value in the determined processing order.

8. An image processing method performed by an image processing apparatus that morphs at least part of a face of a subject in an input image, the method comprising:

an image acquiring step of acquiring the input image;

an object specifying step of specifying an object that is included in the input image and is to be morphed, wherein the object is the at least part of the face of the subject in the input image;

a map morphing step of morphing a shift amount map, wherein the shift amount map defines a target point and shift amounts of pixels in a two-dimensional plane along a direction from a position of the pixels to the target point and represents shift amount peaks as a predetermined shape, and wherein an entirety of the shift amount map is morphed such that the predetermined shape of the shift amount peaks in the map matches a shape of the object to be morphed;

an image morphing step of morphing the image by: matching the target point in the morphed shift amount map with a target point in the object to be morphed; converting a resolution of the morphed shift amount map so as to match with a resolution of the input image; and determining a pixel value of a target pixel that corresponds to the object as a pixel value of a pixel that is located in a straight line connecting the target point and the target pixel in the input image, the pixel also being located away from the target pixel by a shift amount defined for the target pixel in the morphed shift amount map; and a display step of displaying the morphed image, wherein the predetermined shape is a closed loop.

9. A non-transitory computer-readable storage medium having stored therein an image processing program for causing an image processing apparatus that morphs at least part of a face of a subject in an input image to execute:

an image acquiring step of acquiring the input image;

an object specifying step of specifying an object that is included in the input image and is to be morphed, wherein the object is the at least part of the face of the subject in the input image;

a map morphing step of morphing a shift amount map, wherein the shift amount map defines a target point and shift amounts of pixels in a two-dimensional plane along a direction from a position of the pixels to the target point and represents shift amount peaks as a predetermined shape, and wherein an entirety of the shift amount map is morphed such that the predetermined shape of the shift amount peaks in the map matches a shape of the object to be morphed; and an image morphing step of morphing the image by: matching the target point in the morphed shift amount map with a target point in the object to be morphed; converting a resolution of the morphed shift amount map so as to match with a resolution of the input image; and determining a pixel value of a target pixel that corresponds to the object as a pixel value of a pixel that is located in a straight line connecting the target point and the target pixel in the input image, the pixel also being located away from the target pixel by a shift amount defined for the target pixel in the morphed shift amount map; and a display step of displaying the morphed image, wherein the predetermined shape is a closed loop.

* * * * *